United States Patent
Celik et al.

(10) Patent No.: US 11,430,004 B2
(45) Date of Patent: Aug. 30, 2022

(54) AUTOMATIC AFTER CALL APPLICATION DOWNLOAD PLATFORM

(71) Applicant: OnePIN, Inc., Westborough, MA (US)

(72) Inventors: Feyzi Celik, Hopkinton, MA (US); Marcin Nowak, Westborough, MA (US)

(73) Assignee: OnePIN, Inc., Westborough, MA (US)

( * ) Notice: Subject to any disclaimer, the term of this patent is extended or adjusted under 35 U.S.C. 154(b) by 511 days.

(21) Appl. No.: 15/571,668

(22) PCT Filed: May 4, 2016

(86) PCT No.: PCT/US2016/030634
§ 371 (c)(1),
(2) Date: Nov. 3, 2017

(87) PCT Pub. No.: WO2016/179205
PCT Pub. Date: Nov. 10, 2016

(65) Prior Publication Data
US 2019/0130442 A1    May 2, 2019

Related U.S. Application Data

(60) Provisional application No. 62/156,723, filed on May 4, 2015.

(51) Int. Cl.
*G06Q 30/02*    (2012.01)
*H04M 15/00*   (2006.01)
(Continued)

(52) U.S. Cl.
CPC ......... *G06Q 30/0251* (2013.01); *G06F 9/542* (2013.01); *G06F 16/972* (2019.01);
(Continued)

(58) Field of Classification Search
CPC .............................. G06Q 30/02; H04W 12/06
(Continued)

(56) References Cited

U.S. PATENT DOCUMENTS 6,628,770 B1    9/2003  Jain et al.
7,924,989 B1    4/2011  Cooper
(Continued)

FOREIGN PATENT DOCUMENTS

WO    WO2009/023591    2/2009
WO    2012047273 A1    4/2012
(Continued)

OTHER PUBLICATIONS

SIM Application Toolkit—Protocol Conformance and Implementation Challenges, Jain et al., 0-7695-2629-2/06 2006 IEEE.*
(Continued)

*Primary Examiner* — David J Stoltenberg
(74) *Attorney, Agent, or Firm* — Giordano Law LLC; David A. Giordano

(57) ABSTRACT

This disclosure provides methods, systems, and platforms for automatically prompting a mobile device user to download an application to their mobile device after a triggering event. Triggering events include calling a business, receiving a call from a business, and navigating to a website. In some embodiments, a business can run a targeted campaign to automatically prompt a mobile device user to download an application. In some embodiments, the platform interacts with an application installed on the mobile device. The prompt displayed on the mobile device includes an actionable option to download an application.

12 Claims, 8 Drawing Sheets

(51) Int. Cl.
| | |
|---|---|
| *H04M 7/00* | (2006.01) |
| *H04M 1/2757* | (2020.01) |
| *H04M 1/72406* | (2021.01) |
| *H04M 1/72448* | (2021.01) |
| *H04M 3/42* | (2006.01) |
| *H04M 3/493* | (2006.01) |
| *H04W 4/14* | (2009.01) |
| *G06Q 30/00* | (2012.01) |
| *G06Q 50/00* | (2012.01) |
| *H04W 8/18* | (2009.01) |
| *H04W 8/26* | (2009.01) |
| *G06F 16/958* | (2019.01) |
| *G06F 9/54* | (2006.01) |
| *H04W 4/60* | (2018.01) |
| *H04W 4/16* | (2009.01) |
| *H04W 4/21* | (2018.01) |
| *H04M 1/72445* | (2021.01) |
| *H04W 4/00* | (2018.01) |
| *G06F 16/955* | (2019.01) |

(52) U.S. Cl.
CPC ......... *G06Q 30/01* (2013.01); *G06Q 30/0201* (2013.01); *G06Q 30/0203* (2013.01); *G06Q 30/0207* (2013.01); *G06Q 30/0245* (2013.01); *G06Q 30/0267* (2013.01); *G06Q 50/01* (2013.01); *H04M 1/2757* (2020.01); *H04M 1/72406* (2021.01); *H04M 1/72448* (2021.01); *H04M 3/42059* (2013.01); *H04M 3/42102* (2013.01); *H04M 3/42153* (2013.01); *H04M 3/42195* (2013.01); *H04M 3/42357* (2013.01); *H04M 3/42365* (2013.01); *H04M 3/4931* (2013.01); *H04M 7/0042* (2013.01); *H04M 15/58* (2013.01); *H04M 15/62* (2013.01); *H04M 15/705* (2013.01); *H04M 15/735* (2013.01); *H04M 15/7556* (2013.01); *H04M 15/80* (2013.01); *H04M 15/84* (2013.01); *H04M 15/844* (2013.01); *H04M 15/848* (2013.01); *H04M 15/852* (2013.01); *H04M 15/856* (2013.01); *H04W 4/14* (2013.01); *H04W 4/16* (2013.01); *H04W 4/60* (2018.02); *H04W 8/18* (2013.01); *H04W 8/26* (2013.01); *G06F 16/955* (2019.01); *G06Q 30/016* (2013.01); *H04M 1/72445* (2021.01); *H04M 2203/651* (2013.01); *H04M 2203/655* (2013.01); *H04M 2215/8158* (2013.01); *H04W 4/00* (2013.01); *H04W 4/21* (2018.02)

(58) Field of Classification Search
USPC ................. 709/225; 705/14.64; 455/419
See application file for complete search history.

(56) References Cited

U.S. PATENT DOCUMENTS

| | | | |
|---|---|---|---|
| 8,073,460 | B1 | 12/2011 | Scofield et al. |
| 8,175,921 | B1 | 5/2012 | Kopra |
| 8,249,627 | B2 | 8/2012 | Olincy |
| 8,515,803 | B2 | 8/2013 | Meyer et al. |
| 8,712,371 | B2 | 4/2014 | Baker et al. |
| 8,934,876 | B1 | 1/2015 | Cohen |
| 8,971,860 | B1 | 3/2015 | Olincy |
| 8,989,712 | B2 | 3/2015 | Wentker et al. |
| 10,540,693 | B1 | 1/2020 | Monsowitz et al. |
| 2002/0159387 | A1 | 10/2002 | Allison et al. |
| 2003/0065778 | A1* | 4/2003 | Malik .................. G06Q 30/02 709/225 |
| 2004/0252816 | A1 | 12/2004 | Nicolas |
| 2005/0064879 | A1 | 3/2005 | McAvoy |
| 2005/0186939 | A1 | 8/2005 | Barnea et al. |
| 2005/0233733 | A1 | 10/2005 | Roundtree et al. |
| 2005/0289095 | A1 | 12/2005 | Rauhala et al. |
| 2006/0212482 | A1* | 9/2006 | Celik .................. H04M 1/2757 |
| 2006/0271425 | A1 | 11/2006 | Goodman |
| 2006/0285661 | A1 | 12/2006 | Patel et al. |
| 2007/0047523 | A1 | 3/2007 | Jiang |
| 2007/0055995 | A1 | 3/2007 | Jiang |
| 2007/0061197 | A1* | 3/2007 | Ramer .................. G06Q 30/02 705/14.64 |
| 2007/0106698 | A1 | 5/2007 | Elliott et al. |
| 2007/0111748 | A1 | 5/2007 | Risbood |
| 2007/0281689 | A1 | 12/2007 | Altman et al. |
| 2007/0282959 | A1* | 12/2007 | Stern ..................... G06Q 30/02 709/206 |
| 2008/0037738 | A1 | 2/2008 | Nolan et al. |
| 2008/0075249 | A1 | 3/2008 | Zach et al. |
| 2008/0090597 | A1 | 4/2008 | Celik et al. |
| 2008/0261635 | A1 | 10/2008 | Samiri |
| 2008/0292080 | A1 | 11/2008 | Quon et al. |
| 2008/0318554 | A1 | 12/2008 | Romppanen et al. |
| 2008/0318555 | A1 | 12/2008 | Romppanen et al. |
| 2009/0207983 | A1 | 8/2009 | Nour-Omid |
| 2009/0225972 | A1 | 9/2009 | Kahn |
| 2009/0265220 | A1 | 10/2009 | Bayraktar et al. |
| 2009/0270067 | A1 | 10/2009 | Johnson |
| 2009/0280786 | A1 | 11/2009 | Ziklik |
| 2009/0290701 | A1 | 11/2009 | Portman et al. |
| 2009/0318122 | A1 | 12/2009 | White et al. |
| 2010/0042911 | A1* | 2/2010 | Wormald ........... G06Q 30/0267 715/205 |
| 2010/0100387 | A1 | 4/2010 | Kuiken et al. |
| 2010/0161506 | A1 | 6/2010 | Bosenick et al. |
| 2010/0198696 | A1 | 8/2010 | Deshpande |
| 2010/0325221 | A1 | 12/2010 | Cohen et al. |
| 2011/0029380 | A1 | 2/2011 | Moukas et al. |
| 2011/0044438 | A1* | 2/2011 | Wang ..................... G10L 15/26 704/E15.005 |
| 2011/0054920 | A1 | 3/2011 | Phillips et al. |
| 2011/0076989 | A1 | 3/2011 | Lynch |
| 2011/0119126 | A1 | 5/2011 | Park et al. |
| 2011/0131421 | A1 | 6/2011 | Jogand-Coulomb et al. |
| 2011/0151838 | A1 | 6/2011 | Olincy |
| 2011/0151852 | A1 | 6/2011 | Olincy |
| 2011/0287746 | A1 | 11/2011 | Gopinath et al. |
| 2012/0057689 | A1 | 3/2012 | Martin |
| 2012/0101989 | A1 | 4/2012 | Ring et al. |
| 2012/0166271 | A1 | 6/2012 | Wofford et al. |
| 2012/0238251 | A1 | 9/2012 | Lee et al. |
| 2012/0303455 | A1 | 11/2012 | Busch |
| 2012/0315880 | A1 | 12/2012 | Peitrow et al. |
| 2012/0316992 | A1 | 12/2012 | Oborne et al. |
| 2013/0060703 | A1 | 3/2013 | Dala et al. |
| 2013/0086618 | A1 | 4/2013 | Klein et al. |
| 2013/0115872 | A1 | 5/2013 | Huang et al. |
| 2013/0130661 | A1 | 5/2013 | Berner et al. |
| 2013/0144674 | A1 | 6/2013 | Kim et al. |
| 2013/0204704 | A1 | 8/2013 | Ross et al. |
| 2013/0217360 | A1 | 8/2013 | Dakin et al. |
| 2013/0238706 | A1 | 9/2013 | Desai |
| 2013/0290820 | A1 | 10/2013 | Dhanani |
| 2013/0343543 | A1 | 12/2013 | Blaisdell et al. |
| 2014/0007214 | A1 | 1/2014 | Qureshi et al. |
| 2014/0024361 | A1* | 1/2014 | Poon ..................... H04W 12/06 455/419 |
| 2014/0026069 | A1 | 1/2014 | Dennis |
| 2014/0057610 | A1 | 2/2014 | Olincy |
| 2014/0075567 | A1* | 3/2014 | Raleigh ................. H04L 12/14 726/26 |
| 2014/0089098 | A1* | 3/2014 | Roundtree ............ G06Q 30/02 455/418 |
| 2014/0156386 | A1 | 6/2014 | Williams |
| 2014/0161249 | A1 | 6/2014 | Tolksdorf |
| 2014/0188612 | A1 | 7/2014 | Chou et al. |
| 2014/0229238 | A1 | 8/2014 | Meyer et al. |
| 2014/0229277 | A1 | 8/2014 | Khambete |
| 2014/0257985 | A1 | 9/2014 | Gibson et al. |
| 2014/0304068 | A1 | 10/2014 | Weinblatt |
| 2014/0329514 | A1 | 11/2014 | Meriaz |

(56) References Cited

U.S. PATENT DOCUMENTS

| | | |
|---|---|---|
| 2014/0329565 A1 | 11/2014 | Mannix et al. |
| 2015/0019307 A1 | 1/2015 | Girard et al. |
| 2015/0038120 A1 | 2/2015 | Larkin |
| 2015/0071427 A1 | 3/2015 | Kelley et al. |
| 2015/0073891 A1 | 3/2015 | Dauneria |
| 2015/0149301 A1 | 5/2015 | Dow |
| 2015/0180733 A1 | 6/2015 | Krutzler et al. |
| 2015/0201313 A1 | 7/2015 | Celik et al. |
| 2015/0256672 A1 | 9/2015 | Collart |
| 2015/0327042 A1 | 11/2015 | Kempf et al. |
| 2016/0048937 A1 | 2/2016 | Mathura et al. |
| 2016/0063528 A1 | 3/2016 | Zhang |
| 2016/0086160 A1 | 3/2016 | Desai et al. |
| 2017/0228789 A1 | 8/2017 | Macgillivray |
| 2018/0007198 A1 | 1/2018 | Rabra et al. |
| 2018/0032997 A1 | 2/2018 | Gordon et al. |

FOREIGN PATENT DOCUMENTS

| | | |
|---|---|---|
| WO | 2012047273 A9 | 4/2012 |
| WO | WO2014/049322 | 4/2014 |

OTHER PUBLICATIONS

The Research of Event-triggered Application in Proactive SIM Card, Peng et al., 978-1-4244-3693-4/09 © 2009 IEEE.*

International Search Report and Written Opinion, dated May 1, 2015, International Application No. PCTUS2015/010860, filed Jan. 9, 2015, 17 pages.

International Search Report and Written Opinion, dated Jun. 3, 2016, International Application No. PCT/US2016/013112, filed Jan. 12, 2016., 15 pages.

International Search Report and Written Opinion, dated Aug. 11, 2016, International Application No. PCT/US2016/30634, filed May 4, 2016, 15 pages.

International Search Report and Written Opinion, dated Aug. 11, 2016, International Application No. PCT/US2016/30664, filed May 4, 2016, 15 pages.

International Search Report and Written Opinion, dated Aug. 12, 2016, International Application No. PCT/US2016/30612, filed May 3, 2016, 19 pages.

International Search Report and Written Opinion, dated Aug. 12, 2016, International Application No. PCT/US2016/30699, filed May 4, 2016, 15 pages.

International Search Report and Written Opinion, dated Sep. 16, 2016, International Application No. PCT/US2016/30764, filed May 4, 2016, 13 pages.

International Search Report and Written Opinion, dated Aug. 18, 2016, International Application No. PCT/US2016/30859, filed May 4, 2016, 12 pages.

International Search Report and Written Opinion, dated Jul. 25, 2016, International Application No. PCT/US2016/21540, filed Mar. 9, 2016, 17 pages.

* cited by examiner

AUTOMATIC AFTER CALL APPLICATION DOWNLOAD PLATFORM

CROSS-REFERENCE TO RELATED APPLICATIONS

This application claims priority to U.S. Provisional Patent Application No. 62/156,723, filed May 4, 2015. The entire contents of that application are incorporated herein by reference.

BACKGROUND

Smartphones are penetrating all segments of the mobile market and data packages are becoming a "need" when subscribers consider their personal budgets. Today, there are mobile applications for every business, hobby, interest, utility and media channel. In many cases, subscribers are able to navigate online application stores from their own device, choose which applications will meet their needs, and download the applications to their phone over the air. However, there are many applications that can prove to be extremely useful for mobile subscribers that are not downloaded to a user's device, because subscribers are either not aware of them or can't find them easily.

For MNOs (Mobile Network Operators), providing useful, easily-accessible applications to mobile subscribers in a targeted manner is a key factor in growing and maintaining a loyal subscriber base. Today, there is no event-based mechanism that will provide subscribers the opportunity to download relevant applications in a timely manner based on the user's likes, interests, and interactions with specific brands, companies, or businesses. A service platform solution that provides mobile subscribers a means to enhance their productivity and entertainment options via a customized downloadable mechanism fills an open solution gap currently in the mobile market.

SUMMARY

In one aspect, this disclosure provides a computer-implemented method for automatically prompting a user to download content to the user's mobile device after a triggering event. The method comprises receiving, at a server, an indication that a triggering event has occurred; determining, at the server, whether the triggering event matches a triggering event stored in a database operably connected to the server; requesting user information when the triggering event matches a triggering event stored in the database, wherein the user information comprises the Mobile Station International Subscriber Directory Number of the mobile device; receiving, at the server, the user information; preparing an advertising message comprising a plurality of actionable options, wherein at least one actionable option is an option to download content; and sending the advertising message to the user's mobile device. In some embodiments, the triggering event is selected from the group consisting of a phone call placed from the mobile device to a first phone number, an SMS message sent from the mobile device to a second phone number, a phone call received at the mobile device from a third phone number, navigation to a specific web address on the mobile device, navigation away from a specific web address on the mobile device, and commencement of a campaign to a targeted group.

In some embodiments, the advertising message further comprises one or more actionable options selected from the group consisting of an option to be reminded later, an option to indicate that the user is not interested, and an option to stop receiving advertising messages.

In some embodiments, the content is selected from the group consisting of an application, music, a ringtone, a recorded message, a podcast, a photo, or a video. In certain embodiments, the video is selected from the group consisting of a commercial, a movie trailer, a full length film, a sports highlight, a news clip, an interview, and a music video.

In some embodiments, the method further comprises receiving at the server a communication comprising the option selected on the mobile device.

In some embodiments, the user information further comprises the mobile device type or the Type Allocation Code (TAC).

In certain embodiments, the method further comprises sending a communication to the mobile device, wherein the communication comprises instructions for an application on the mobile device to launch the mobile device's application store. In some embodiments, the communication further comprises instructions to navigate the application store to a link to download an application. In some embodiments, the method also comprises sending a communication to the mobile device, wherein the communication comprises instructions to cause the mobile device's browser to navigate to a web address where the content can be downloaded. In still other embodiments, the method also comprises sending a communication to the mobile device, wherein the communication comprises instructions to cause the mobile device to download the application.

In some embodiments, the method further comprises storing the user's selected response. In some embodiments, the method further comprises determining how many advertising messages have been sent to the user's device. In further embodiments, the method also comprises determining how many advertising messages have been sent to the user's device during a specific time period.

In some embodiments of the method, the advertising message is selected from the group consisting of binary SMS, flash SMS, MMS, standard SMS, USSD notification, and email.

In some embodiments, the method further comprises determining whether the mobile device is roaming.

In some embodiments, the method also comprises determining whether the user has previously selected an actionable option to stop receiving advertising messages.

Another aspect of this disclosure provides a computer-implemented method for automatically prompting a user to download content to the user's mobile phone, the method comprising: receiving, at the processor in the mobile phone, an indication that a triggering event has occurred; receiving at the mobile device an advertising message comprising a plurality of actionable options, wherein at least one of the actionable options is an actionable option to download content; and displaying on the screen the advertising message.

In some embodiments, the method also comprises playing an alert tone on the mobile device when the advertising message is displayed.

In some embodiments of the method, the content is selected from the group consisting of an application, music, a ringtone, a recorded message, a podcast, a photo, or a video. In certain embodiments, the video is selected from the group consisting of a commercial, a movie trailer, a full length film, a sports highlight, a news clip, an interview, and a music video.

In some embodiments of the method, the triggering event is selected from the group consisting of a phone call placed from the mobile device to a first phone number, a phone call received at the mobile device from a second phone number, navigation to a specific web address on the mobile device, and navigation away from a specific web address on the mobile device.

In some embodiments, the method further comprises launching an application installed on the mobile device. In certain embodiments of the method, the application causes the advertising message to be displayed. In some embodiments of the method, the application causes the mobile phone to play a tone when the advertising message is displayed.

In some embodiments, the method also comprises receiving, in the application, the actionable option selected on the mobile device. In some embodiments, the method further comprises: sending a communication comprising the actionable option selected on the mobile device; and receiving a download message comprising executable instructions corresponding to the actionable option selected on the mobile device, wherein the executable instructions are executable by the application.

In some embodiments, the method further comprises downloading the content corresponding to the actionable option selected on the mobile device, wherein the actionable option selected on the mobile device indicates the user desires to download the content.

In some embodiments of the method, the application is installed on the SIM card. In other embodiments of the method, the application is installed on the operating system of the mobile phone.

In some embodiments of the method, the advertising message is selected from the group consisting of binary SMS, flash SMS, MMS, standard SMS, USSD notification, and email.

DETAILED DESCRIPTION

Figure 1:
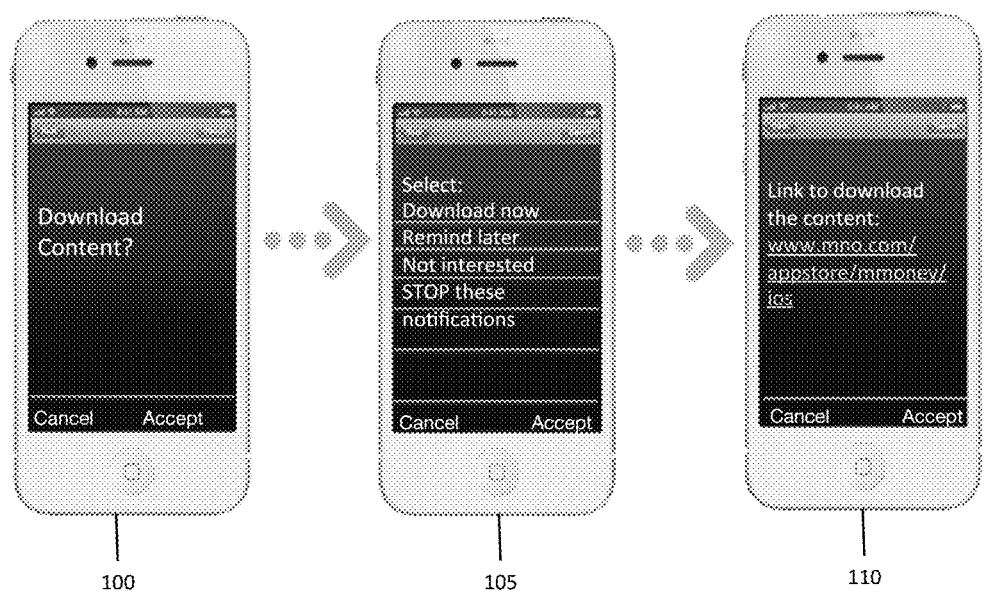
FIG. 1 is a graphical overview illustrating the user interface by which a user may download and application directly into his or her mobile device after a user generated event, via an interactive prompt.

This application provides aspects and embodiments of OnePIN's MaXapp™ platform. The term "MaXapp" is used throughout this application to refer to multiple aspects and embodiments of the methods, applications, services, systems, and platforms disclosed herein. The name "MaXapp" is not limited to any specific embodiment and can refer to multiple embodiments or individual embodiments. Furthermore, other names are also used to refer to embodiments described herein.

As used herein, the terms "a" and "an" mean one or more than one.

In one aspect, MaXapp is an application download boosting platform. It allows MNOs to target groups of subscribers and promote the download of strategic applications either within their own app store or within other stores based on the MNO's objectives.

MaXapp makes it easier for MNOs or entities (e.g., businesses, non-profit groups, political groups, etc.) to provide targeted, relevant applications and downloadable content to subscribers. Subscribers see a prompt which they can quickly action with a single click. In some embodiments, the prompt asks subscribers if they would like to add an application on their phone. This could be an application developed by the MNO, one developed by an outside party, or even an application that resides on the SIM card. The MaXapp cloud ensures that the correct application type is delivered to the subscriber, based on the subscriber's phone operating system. Subscribers can easily download new applications specific to their device. As used herein, the term "application" refers collectively to downloadable user content including, but not limited to, applications, music, ringtones, a recorded message, a podcast, a photo, or a video.

In one aspect, MaXapp is a cloud based platform that interacts with a client application residing on the phone—either as a downloadable application from an external site, within the device OS or within a SIM card.

MaXapp is relevant for any subscriber type (prepaid, postpaid, corporate subscribers, mass market, etc). An opt-out option is available for subscribers who do not wish to receive future updates. In some embodiments, application marketing can be targeted for specific segments. In some embodiments, application vendors pay a marketing fee to promote downloads using the MaXapp service—thereby generating an additional value added revenue stream for MNOs. In some embodiments, the MaXapp service is offered to subscribers for free. Typically, subscribers pay for data plans enabling application downloads and additional data use as required by the downloaded applications.

Subscribers receive timely notifications of new and useful applications specific to their device type that are ready to download. Easy "remind me later" and opt-out options are available.

Notifications can be pushed to the subscriber in a general push campaign. In other embodiments, a subscriber can be targeted after a specific trigger event. In some embodiments, a subscriber would see the prompt to download an application after a trigger event such as making a phone call, after receiving a phone call from an entity with an active MaXapp campaign, after sending an SMS, MMS, or email communication to an address specified by an entity with an active MaXapp campaign, after navigating to or away from a specific web address, or after interacting with a specific entity via social media applications.

Operation

The following example illustrates how an embodiment of MaXapp works: Bob has a MaXapp application on his device. This application may reside on his SIM card, it could be embedded in the device operating system, or in some embodiments, can also be an application that a user may choose to add to their device themselves (often called "over the top" mobile applications or "on deck" mobile applications).

Bob makes a call to Lufthansa Airlines to check on his flight status. After the call, the MNO network informs the MaXapp platform that Bob has called a target number. The cloud automatically sends Bob a notification, which appears on his mobile phone. The notification could be a binary SMS, flash SMS, MMS, standard SMS, USSD notification, email, or other web based or IP based notification. In some embodiments, the cloud server, via the MaXapp application, also tracks the type of device Bob is using, and recognizes that Bob is using a smartphone. In some embodiments, Bob sees the following exemplary message displayed on his phone:

Thanks for calling Lufthansa airlines. Download our smartphone application for your Samsung Android device today, and make is simple to book tickets, check flight status, and receive the latest promotions! Click OK to continue. www.onepin.com/lufthansa.

In one embodiment, Bob clicks "OK" and his response is sent back to the MaXapp platform either over an IP connection or by any type of SMS. The platform checks Bob's device type, and then sends a communication back to his device which automatically launches the application store on his device and takes him directly to the Lufthansa Airlines application where he can accept the download and add it to his phone. In some embodiments, the initial communication comprises instructions to launch the application store on the device if Bob clicks "OK."

In another embodiment, Bob clicks on the link within the message prompt he sees after the phone call, and is directed to a site where he is able to download an application appropriate for his mobile device. After selecting the application, he may receive another (optional) confirmation message, generated from the cloud with the information and weblink contained again in the event that Bob did not successfully download the application the first time.

In yet another embodiment, the application may be added directly over-the-air to Bob's SIM card or his device by the mobile operator network.

The MaXapp service can also be run in a targeted campaign manner. In this scenario, the MaXapp platform (server) recognizes that Bob has made several calls to Lufthansa Airlines in the past. He may then be targeted via a push campaign to download the Lufthansa mobile application. In some embodiments, the campaign is run during or at a specified time.

Bob may also trigger the MaXapp service after sending a text message to a Lufthansa Airlines shortcode. He may also trigger MaXapp, meaning he sees the download notification, after navigating to the Lufthansa Airlines website on his mobile device. In these embodiments, Bob has displayed an interest in the company or has shown that he has a willingness to interact with the business or brand. By targeting Bob with event-based communications, the likelihood that Bob will find the promoted applications useful and relevant is higher than if he were merely targeted via a broad push campaign.

In other embodiments, the MaXapp service may trigger after a business calls a user. For example, Lufthansa Airlines calls Bob to notify him that his flight is delayed. After the call, Bob see the MaXapp notification to download the Lufthansa Airlines application.

In some embodiments, MNOs determine which applications they would like to promote to subscribers. MNOs can also use the MaXapp service as a chargeable advertising platform for other application vendors. Vendors can promote their apps for an advertising fee—paid to the MNO. The MNO determines the number of subscribers who should be targeted, and when the target campaign will be run. It is also possible to target by region and/or by segment (prepaid vs. postpaid). Targeted campaigns allow the MNO to provide specific applications to appropriate user groups—thereby encouraging a greater download percentage and ensuring that the subscriber base is not continually "spammed" with notifications that are not relevant for them.

In some embodiments, companies, brands, or other entities may choose to offer downloadable content other than a specific mobile application. Promoted content could include music, ringtones, a recorded message, a podcast, a photo or an image. Promoted content could also include a video such as a commercial, movie trailer, full length film, sports highlight, music video, interview, or any other video content.

In some embodiments, when the campaign is run, subscribers see a message displayed on their screen describing the application that is available for download. In some embodiments, the mobile device optionally plays an alert tone (similar to an incoming SMS alert tone) in conjunction with displaying the message. In some embodiments, the message is immediately actionable—it is not simply an SMS in their inbox. Subscribers can click on "OK" (or "Accept") to learn more. They have a series of options including:

Download Now: Choosing this selection sends a message back to the MaXapp Cloud. The subscriber is then sent an SMS with a downloadable link. The link is specific to their application device type. Device management is handled by the MaXapp platform. Alternatively, device management information can be obtained from the mobile operator's network.

Remind me later: If a subscriber chooses to be reminded later, this selection is sent back to the MaXapp Cloud. The Cloud will resend the message notification at a predefined time. This delay is configurable and can be set by the MNO. In other embodiments, the user can select when he would like to be reminded.

Not Interested (Do Not Download): If a subscriber selects "Do not download" or "Not interested" this selection is sent back to the MaXapp Cloud. The number of "Not interested" responses helps the MNO determine the overall interest level in the promoted application. The MaXapp Cloud also tracks the number of Not Interested responses from a specific MSISDN (over multiple campaigns). If a subscriber repeatedly selects "Not Interested" than the MaXapp Cloud will automatically send an opt-out notification, asking the subscriber if he wishes to turn off all future notifications about applications available for download.

Stop these notifications: If a subscriber opts-out of the service, this response is sent back to the MaXapp Cloud. A confirmation can be sent back to the subscriber, confirming that no future notifications will be sent (this confirmation message is configurable and can be set by the MNO). Subscribers who have opted out are tracked by the Cloud, and future campaigns automatically exclude these customers.

In some embodiments, subscribers do not need to opt-in to the MaXapp service. In other embodiments, MaXapp can send a communication asking a subscriber whether the subscriber desires to opt-in to the service. In some embodiments, subscribers receive relevant notifications automatically as determined by the MNO. Subscribers can opt-out anytime. When an application is promoted, the subscriber has the option to select "stop all notifications." (See example in previous section). In some embodiments, the subscriber can send a "STOP" SMS notification to a designated short-code which will automatically turn off the service. MaXapp also has the intelligence to ask the user if he would like to opt-out of the service if he consistently chooses not to download any of the applications offered by the MNO. MaXapp can offer the automatic opt-out opportunity if the user chooses to download any of the MNO suggested applications after a specified consecutive refusals or percentage of refusals. This value is configurable and can be changed at any time. Subscriber selections are tracked within the MaXapp Cloud in order to manage the automatic opt-out process.

In some embodiments, where there is a charge for downloading the suggested application (if the MNO chooses to charge for the application), a configurable pricing notification, configured within the MaXapp Cloud, is shown to the subscriber to ensure the user understands. In the event where an application will be charged, the subscriber must accept this screen prior to the download beginning. If the subscriber does not select "OK" on this screen, no charges will occur and the download will not begin.

When subscribers are roaming outside of the country, the service can be configured such that any notifications sent from the platform and received on the remote device will be automatically ignored by the remote MaXapp application. In this embodiment, no prompts will display to the subscriber. This ensures that unnecessary data charges are not incurred by the subscriber.

The MaXapp platform includes a web interface that enables businesses, enterprises, marketers, and system administrators to log in and create a campaign. Within the campaign event, businesses or mobile operators can enter relevant information including, but not limited to the target phone number(s), SMS codes, and web site addresses that will trigger different services when called. The timeframe during which a campaign will be relevant is also set. The user interface specifics (i.e., the text mobile consumers will see) is also entered via the web interface.

In some embodiments, the server is connected to a mobile network operator's network via an Application Programming Interface (API). The MaXapp cloud platform may be connected to the mobile operator's call switch, billing platform, HLR (Home Location Registry), SMSC (Short Message Service Center) or router bank (managing web traffic) depending on the operator's network structure. When a designated user event occurs (i.e., a mobile subscriber calls a business's phone number), the API informs the cloud platform. The business phone number and the mobile subscriber's phone number (MSISDN) are both passed to the MaXapp platform via the API, in addition to the date and time.

When the MaXapp cloud receives communications via the API, the campaign ID is checked to determine which campaign should be executed (as there will be multiple campaigns for different businesses running on the platform at the same time). In some embodiments, the platform also checks the caller's phone number to determine if the calling party has opted out from any services. If the calling party has opted out of the service, then processing ends and no further communications are sent to the user.

If the calling party is not on the opt-out blacklist, then an appropriate campaign message is prepared based on the configuration criteria and sent to the mobile subscriber. In some embodiments, this communication is described as a SMS which triggers a remote application on the user's mobile phone. This could be a binary SMS, standard text SMS, a specialized (flash, class 1) SMS, or a class 2 SMS which the handset passes to a SIM card within the device. Alternatively, communications can occur via MMS, email, USSD, or via other web-based communications channels between the mobile phone and the platform.

When the message is received on the user's mobile device, the client application displays an interactive prompt. The user is able to select a response, which is then sent back to the cloud via the application. Communication back to the cloud can be via a data channel, SMS, MMS, etc.

The above embodiments can also be implemented in a manner where a client application (either on the phone or on the SIM card) is not required. In this instance, a USSD channel is opened and the communications between the mobile subscriber and the platform occur via USSD communications.

The cloud server can have the intelligence to collect the device type of the respective mobile devices and can send a message to the respective client applications to "turn off" the client application in mobile devices that have known issues and/or bugs that interfere with the service.

In addition to after-call techniques, each of the above services can be conducted in an intelligent campaign manner. The server is able to track calls that individual subscribers make to businesses. If a business would like to run a campaign at a later date, subscribers who have called that business in the past can be targeted. This makes the prompts to the mobile subscribers relevant, as a previous relationship with the company had already been established by the mobile consumer.

The intelligent campaigns can be arranged to run at predefined dates and times, and for selected groups of subscribers in a regional area based on the subscriber's area code.

FIG. 1 showcases an exemplary embodiment that of a user interface that a mobile consumer would see when the MaXapp service triggers and displays a prompt to the consumer after an event. Prior to stage 100, a phone call is placed to a business currently running a MaXapp campaign. Immediately after the phone call ends and an interactive prompt displays. In some embodiments, a tone is played by the mobile device in conjunction with the display of an interactive prompt.

In some embodiments, the text displayed on the mobile device is fully configurable by the business that was called. In this example, a mobile user calls a bank to check her balance. After the phone call, the user sees an automatic, interactive prompt on the screen of her mobile device. In some embodiments, there are multiple selections she can choose, as shown in stage 105. In other embodiments, the user can select a download option from the initial interactive prompt.

In an embodiment where the mobile user interacts with the campaign message and chooses to download the mobile application onto her device, she can receive an SMS notification with a clickable link that will allow her to navigate to an application download site specific to her mobile device, as seen in stage 110. In other embodiments, as discussed above, if the user elects to download the application to the mobile device, making the relevant selection on the interactive prompt will launch the mobile device's application store. In some embodiments, the mobile device's application store is launched right to the location where the user can download the application from the application store.

Figure 2:
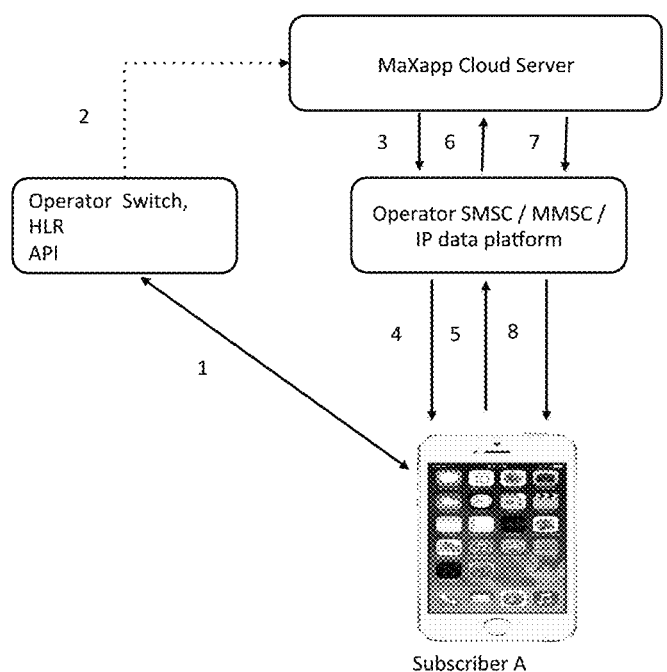
FIG. 2 is a flowchart illustrating the basic architecture of the MaXapp platform.

FIG. 2 is a flowchart illustrating an exemplary embodiment of the architecture of the MaXapp platform. In one embodiment, as shown in FIG. 2, MaXapp utilizes the following connectivity structure:

Mobile Subscriber A initiates a user-generated event after a trigger event. In some embodiments, the trigger event is one of placing a phone call from the mobile device, after receiving a phone call from an entity with an active MaXapp campaign, after sending an SMS, MMS, or email communication to an address specified by an entity with an active MaXapp campaign, after navigating to or away from a specific web address, or after interacting with a specific entity via social media applications. In some embodiments, the Operator Switch or HLR (Home Location Registry) are in constant, near-constant, or periodic communication with the MaXapp platform ("2"). In some embodiments, the Mobile Operator network notifies the MaXapp platform when a specific target phone number is dialed or received, or when a user navigates to a specific website. In some embodiments, the Mobile Operator network notifies the MaXApp server that a number linked to a specific campaign is dialed, or a website linked to a specific campaign is accessed. In some embodiments, the API notifies the MaXapp server that that a number linked to a specific campaign is dialed, or a website linked to a specific campaign is accessed.

In some embodiments, after a target phone number is dialed or a specific website is visited, the required information necessary to trigger a campaign is passed to the MaXapp platform via an API ("2"). In other embodiments, the information is passed from the Mobile Operator network to the MaXapp server directly. The platform processes the information and prepares a campaign message to be sent to a mobile subscriber.

In one embodiment, the MaXapp platform sends the campaign message to a Mobile Network Operator SMSC (Short Message Service Center) via an SMPP (Short Message Peer-to-Peer) connection ("3"). Other connection types in other embodiments are also possible. In some embodiments, the platform may also be connected to an MNO's MMSC (MultiMedia Message Service Center). The Operator SMSC or MMSC forwards the MaXapp campaign message to Subscriber A's device ("4").

The campaign message is receive by Subscriber A's mobile device. In some embodiments, the message triggers an application on the mobile device which processes the message and causes an actionable message to be displayed on the screen of Subscriber A's mobile device. The application promotion appears on Subscriber A's device as exemplified in FIG. 1, at which point the subscriber selects his or her preferred option.

In some embodiments, the MaXapp application on Subscriber A's mobile device forwards the response selected by Subscriber A to a designated short code at the Operator SMSC ("5").

The Operator SMSC receives and forwards the response to the MaXapp platform. In some embodiments, the message that the SMSC sends to the MaXapp platform is in the form of a binary SMS message ("6").

Next, the MaXapp platform parses the message and determines an appropriate response to Subscriber A based on Subscriber A's device type and interest in the campaign promotion. In the instance where Subscriber A chose to download the application or content promoted via the MaXapp service, the platform sends a message back to the subscriber with a link the subscriber is able to access. Alternatively, the platform may add the application directly to the user's device or SIM card over an IP connection or via an SMS download. In further embodiments, the MaXapp platform sends a message back to the subscriber that is formatted to launch the application store on Subscriber A's mobile device. In some embodiments, the message is formatted to launch the application store and take Subscriber A directly to the download for the specific application. These messages would flow through the MNOs SMSC ("7") or via the network data architecture.

In some embodiments, after Subscriber A elects to download the application, the Mobile Operator network (at SMSC, MMSC, IP data network in FIG. 2) delivers the requested application to the device user "(8)".

Figure 3:
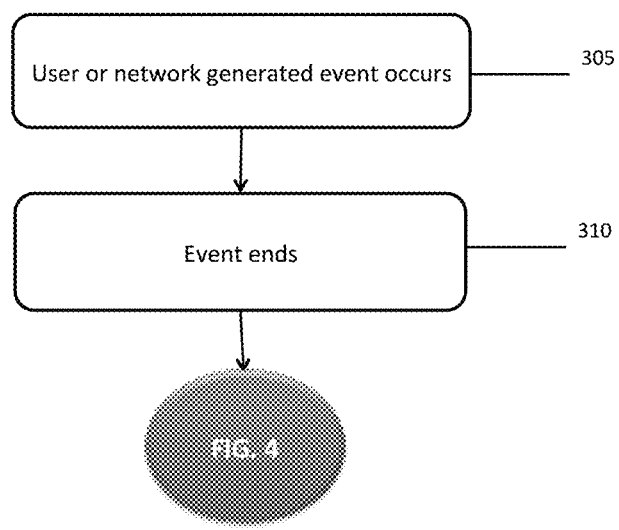
FIG. 3 is a flowchart illustrating the steps related to a phone call event that will lead to the eventual triggering of the MaXapp service.

FIG. 3 is a flowchart illustrating the steps related to a mobile user or network event that will lead to the eventual triggering of the MaXapp service. In stage 305, a user generated event occurs such as a phone call to a business or an SMS sent to a specific shortcode or number. In other embodiments, the user may have received a phone call from a business. Additional embodiments could include the mobile user navigating to a specific website. As an example, Lisa, a mobile user could use her mobile phone to call Citibank to check on her balance. At stage 310, the phone call event ends. In other embodiments, Lisa could also navigate to the Citibank website using her mobile phone. In some embodiments, the user is prompted when the user navigates to a specific web address. In some such embodiments, the prompt message can appear "on top" of the browser screen. In some embodiments, the user is prompted after the user navigates away from a specific web address or after the user ends the browser session.

Figure 4:
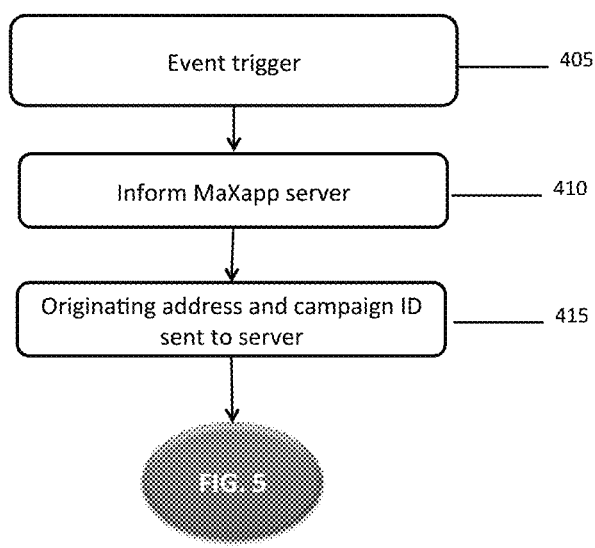
FIG. 4 is a flowchart illustrating the Mobile Operator Network as it would interact with the MaXapp server platform.

FIG. 4 is a flowchart illustrating the interaction between the Mobile Operator Network and the MaXapp server platform. In stage 405, the event trigger occurs. As outlined above, this could include a phone call event, an SMS event, or an IP event when a mobile user navigates to or away from a specific website. Subsequently, the MaXapp server is informed of the event at stage 410. The mobile network could inform the MaXapp platform via an API, webservice, email, file transfer, or SMS notification. Unique identifying information about the mobile subscriber is passed to the MaXapp platform in stage 415. This information could include the mobile subscriber's MSISDN (Mobile Station International Subscriber Directory Number), often referred to as an OA (Originating Address) in the embodiment where a phone call is placed or an SMS is sent. In other embodiments, the ICCID (Integrated Circuit Card Identifier) of the user's SIM card may also be sent by the network to the platform. In some embodiments, the date and time the event occurred may also be passed to the platform. In some embodiments, the mobile network may also designate a campaign ID or other identifier that will trigger a specific unique campaign. Other identifiers could include information such as the phone number dialed (also known as the Destination Address), the SMS code dialed, or a website address. The MaXapp platform proceeds to process the information, as outlined in FIG. 5.

Figure 5:
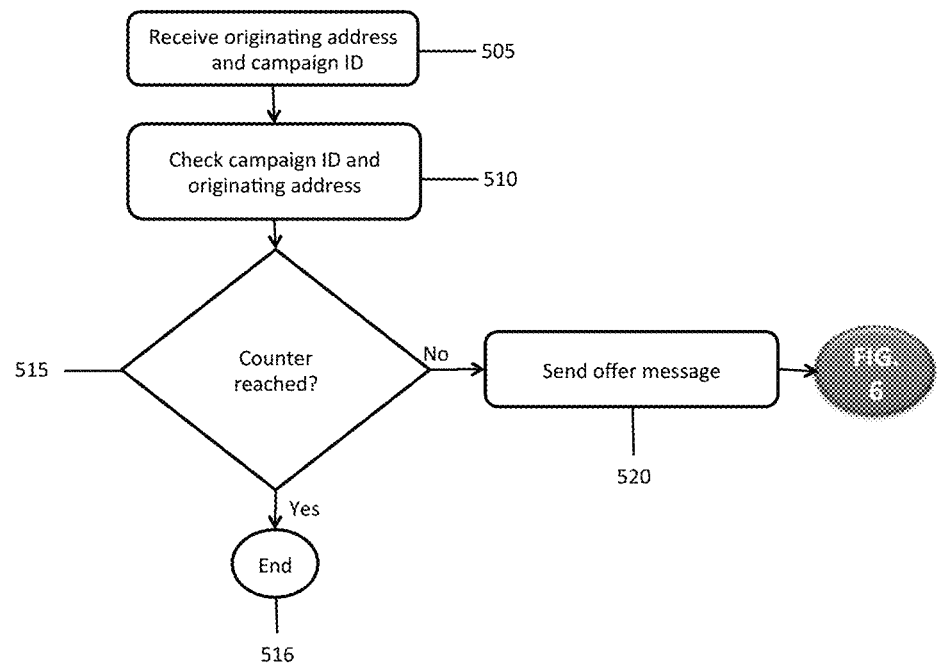
FIG. 5 is a flowchart illustrating the exemplary process of the logic the MaXapp platform uses to determine if a campaign message should be sent to a specific targeted mobile subscriber.

FIG. 5 is a flowchart illustrating the exemplary process of the logic the MaXapp platform uses to determine if a campaign message should be sent to a specific targeted mobile subscriber. In stage 505, the MaXapp platform receives information related to a specific mobile user. In some embodiments, the MaXapp platform checks the campaign definition ID to ensure the campaign is still relevant for this user, as outlined in stage 510. In some embodiments, as exemplified by stage 515, the MaXapp platform also checks all rules associated with configurable counter settings to ensure a MaXapp communication should be sent to the user. The counters may define items such as the total number of MaXapp offers the mobile subscriber should see during a given time period or the total number of offers shown to a mobile subscriber for a specific brand or company. Other embodiments include additional configurable settings. In some embodiments, the MaXApp platform also checks to determine if the user is on an opt-out list, meaning the subscriber has chosen not to receive notifications. In other embodiments, the platform could also check to determine if the subscriber has been blacklisted, meaning that the mobile network operator does not wish to have the user receive offers. At stage 515, the platform checks the counters and configurations that are in place. If the user has exceeded threshold settings, or has opted out of notifications, or should not receive the offer for any reason, the platform database is updated and processing ends as shown at stage 516. If the user meets all qualifications, a MaXapp offer message is sent to the subscriber in stage 520. The offer message is delivered to the mobile user, and MaXapp application processing at the remote device ensues, as outlined in FIG. 6.

Figure 6:
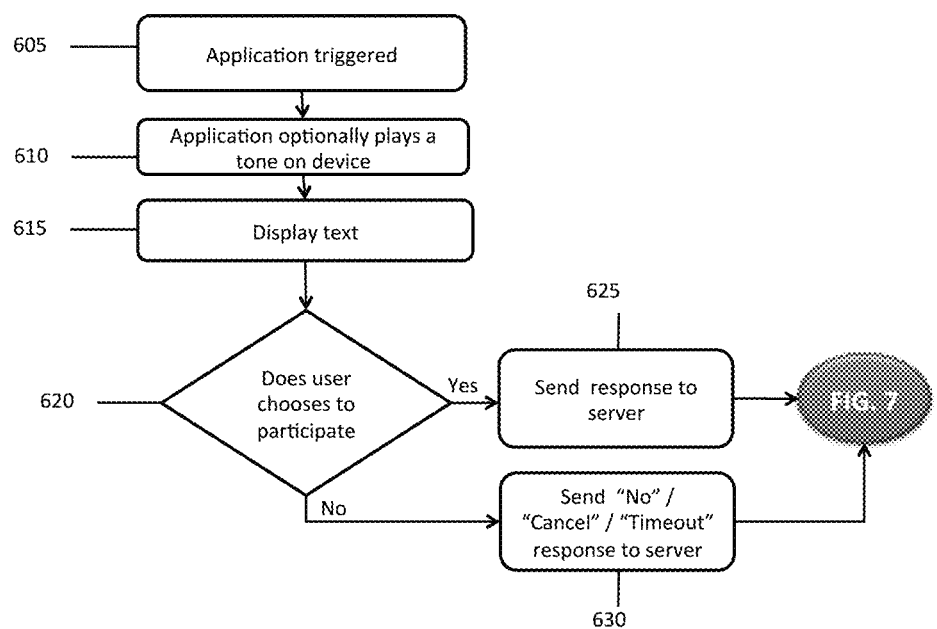
FIG. 6 is a flowchart illustrating the exemplary process of how the MaXapp application is expressed and interacts with the user device, and thus the user experience.

FIG. 6 is a flowchart illustrating the exemplary embodiment showing how the MaXapp application is expressed and interacts with the user device. At stage 605, the offer message arrives at the mobile device and the MaXapp application is triggered on the device. In some embodiments, the applications may play an alert tone at stage 610 to notify the mobile user. The offer text is displayed at stage 615. In some embodiments, the campaign text is fully configurable at the platform server, and can contain logos, IDs, photos, pictures, text, weblinks, or music files. The text can include letters, numbers, any type of punctuation, emoticons, and Unicode encoded characters, such Cyrillic letters. In an examplary embodiment, the text may state:

"Thank you for calling Citibank. Download the Citi mobile application now and discover financial services tailored to your life. Click OK to continue."

The length of time the offer displays on the screen is configurable at the server. If the user chooses not to participate, in some embodiments, his selection is sent back to the MaXapp platform at stage 630, and is logged within the database. In some embodiments, if the user does not see the notification, the message displayed will timeout and automatically disappear. In some embodiments, a message is then returned to the platform indicating the timeout. The platform can be configured to automatically retry the offer at a later time in the event of a timeout. In one embodiment, the user may also choose to be reminded of the offer later. The user's response is returned to the platform and the mobile subscriber will receive a notification at a later time, as configured on the platform. Alternatively, in the embodiment where the user choose to be reminded at a later time, the user could also define the time interval when he would like to receive the reminder notification. If the mobile subscriber chooses to participate in the offer, his acceptance selection is returned to the server in stage 625 and processed by the platform. Further platform processing is described in FIG. 7.

Figure 7:
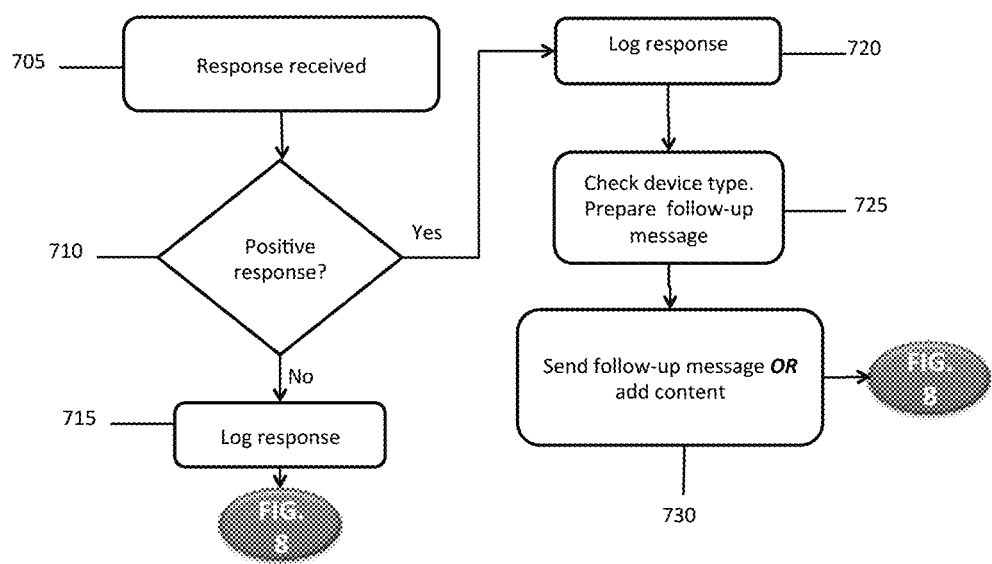
FIG. 7 is a flowchart illustrating the exemplary process of how the MaXapp platform logs the mobile device user's response and determines the appropriate format for adding an application to the user's device, based on the operating system or device type.

FIG. 7 is a flowchart illustrating the exemplary process of how the MaXapp platform logs the mobile device user's response and determines the appropriate format for adding an application to the user's device, based on the operating system or device type. At stage 705, the subscriber response is received at the MaxApp platform. The platform checks the subscriber response at stage 710, and determines if the response is positive or negative. In the case where the subscriber chose not to participate, the platform logs the response at stage 715, updating the rule set including the counters and configuration specific to that user. In the embodiment where the subscriber expresses a positive response (e.g., requesting to download the app), the response is logged at stage 720. The user's device type is checked at stage 725 and in some embodiments, a subsequent follow-up message may be prepared and then sent to the user at stage 730. In an example embodiment, the follow-up message could state:

"Click the link below to download the FREE CitiBank application for your iPhone."
www.mno.com/appstore/mmoney/ios In some embodiments, the message directs the mobile user to a mobile application store installed on the phone where he can confirm the installation of the promoted application or a website where the download can proceed from. In other embodiments, the MaXapp application may be able to launch the mobile application site directly from the user's device with the offered application ready to download. In embodiments where security measures allow, the application could be added over the air directly to the user's device as an on-deck or over-the-top application addition. In the embodiment where the application will be added to the user's SIM card, the MaXapp platform sends the application to the SIM card via encrypted messages. Alternatively, the MaXapp platform may communicate with a separate Over the Air platform within the network designed to deliver applications securely to the SIM card. In other embodiments, the message directs the user to download other content such as music, ringtones, a recorded message, a podcast, a photo, or a video.

Figure 8:
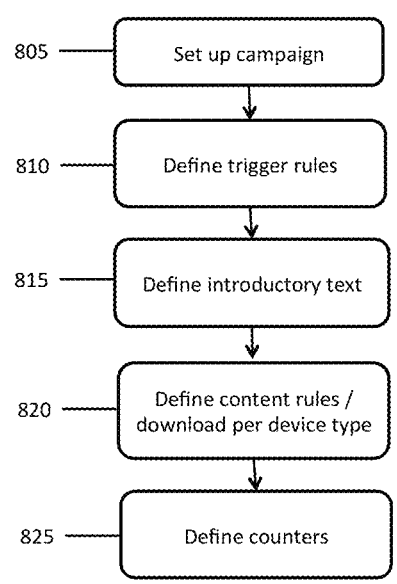
FIG. 8 is a flowchart illustrating the exemplary process of how a MaXapp campaign is designed.

FIG. 8 is a flowchart illustrating the exemplary process of how the MaXapp campaign is designed. At stage 805, the campaign is defined within the server. This includes the days and times during which the campaign will be relevant. Specific geographic regions can also be configured. A maximum number of targeted mobile subscribers can also be set. At stage 810, any phone numbers that trigger the campaign, whether for calls placed or for calls received, are defined. Website data is also configured. In some embodiments, when a mobile user navigates to a designated web address, the MaXapp service is triggered. In some embodiments, when a mobile user navigates away from a designated web address, the MaXapp service is triggered. Next, during stage 815, the actual campaign text that will be shown to a mobile user is defined.

In stage 820, the information that will be sent to the mobile user promoting the content or application download is defined. In stage 825, configurable counters and rules for the campaign are set. In one embodiment, this could include the number of times a specific unique mobile subscriber, as defined by his MSISDN, is prompted to download content after dialing a business phone number or navigating to the business webpage.

EQUIVALENTS

It is to be understood that the foregoing description is intended to illustrate and not limit the scope of the invention, which is defined by the scope of the appended claims. Those skilled in the art will recognize, or be able to ascertain, using no more than routine experimentation, numerous equivalents to the specific embodiments described specifically in this disclosure. Such equivalents, and other aspects, advantages, and modifications are within the scope of the following claims.

The invention claimed is:

1. A computer-implemented method for automatically sending a message to a mobile device connected to a mobile network, immediately after a triggering event, the message configured to prompt a user of the mobile device to download content from a business to the mobile device, the method comprising:

receiving, at a server operably connected to the mobile network via an Operator Switch, Home Location registry, or application programming interface (API), an indication from a Mobile Operator that a triggering event has occurred, wherein the triggering event is selected from the group consisting of a call connected between the mobile device and the business a Short Message Service or Multimedia Message Service message sent from the mobile device to the business, navigation to or from a specific web address of the business, and the mobile device entering a specific geographic region;

receiving, at the server, a campaign identifier (ID) associated with the business, the Mobile Station International Subscriber Directory Number of the mobile device, and the device type;

determining, at the server, whether the campaign ID is associated with an active campaign of the business;

preparing, at the server, a first message, formatted for the device type, comprising a plurality of actionable options, wherein at least one actionable option comprises an option to download content, wherein the content is selected from the group consisting of an application, music, a ringtone, a recorded message, a podcast, a photo, and a video, wherein the first message is configured to be processed by an application installed on a Subscriber Identity Module (SIM) card of the mobile device;

sending the first message to the SIM card of the mobile device via the Mobile Operator's Short Message Service Center (SMSC) or MultiMedia Message Service Center (MMSC), wherein the first message is configured to prompt the user to download content to the mobile device when the message is displayed on a screen of the mobile device;

receiving, at the server, a response message comprising one of the plurality of actionable options selected on the mobile device; and sending, from the server, to the mobile device via the SMSC or MMSC, a second message configured to launch an application on the mobile device.

2. The method of claim 1, wherein the first message further comprises one or more actionable options selected from the group consisting of an option to be reminded later, an option to indicate that the user is not interested, and an option to stop receiving messages.

3. The method of claim 1, wherein the video is selected from the group consisting of a commercial, a movie trailer, a full length film, a sports highlight, a news clip, an interview, and a music video.

4. The method of claim 1, wherein the application is an application store.

5. The method of claim 1, wherein the application is a browser.

6. The method of claim 1, wherein the second message comprises instructions to cause the mobile device to download an application.

7. The method of claim 1, further comprising storing the user's selected response.

8. The method of claim 1, further comprising determining how many messages have been sent to the user's device.

9. The method of claim 8, further comprising determining how many messages have been sent to the user's device during a specific time period.

10. The method of claim 1, wherein the first message is selected from the group consisting of binary SMS, flash SMS, MMS, standard SMS, Unstructured Supplementary Service Data notification, and email.

11. The method of claim 1, further comprising determining whether the mobile device is roaming.

12. The method of claim 1, further comprising determining whether the user has previously selected an actionable option to stop receiving messages.

* * * * *